Patented Jan. 26, 1926.

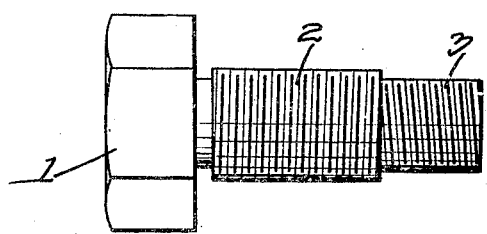
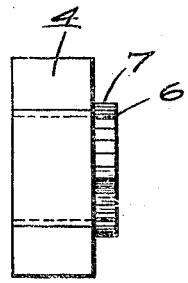
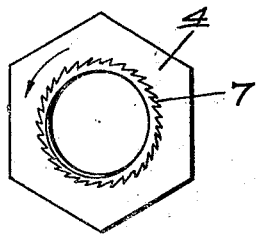
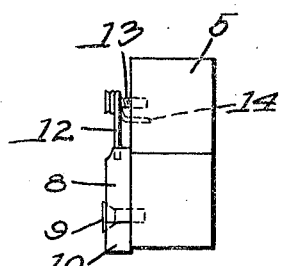
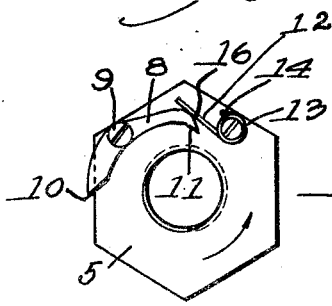
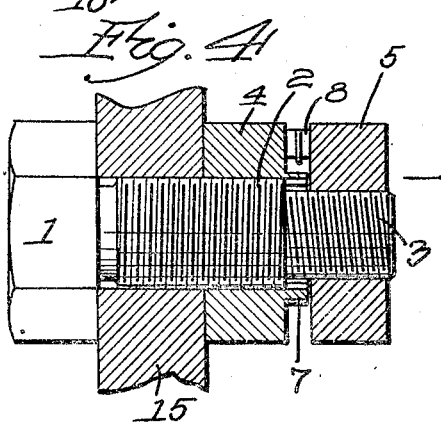

1,571,037

UNITED STATES PATENT OFFICE.

ARTHUR F. BARTLETT AND WILLIAM F. STRAUB, OF FITCHBURG, MASSACHUSETTS.

NUT LOCK.

Application filed September 30, 1925. Serial No. 59,606.

*To all whom it may concern:*

Be it known that we, ARTHUR F. BARTLETT and WILLIAM F. STRAUB, both citizens of the United States, residing at Fitchburg, in the county of Worcester and Commonwealth of Massachusetts, have invented a new and useful Improvement in a Nut Lock, of which the following, together with the accompanying drawings, is a specification.

Our invention relates to nut locks of the type wherein the bolt has right and left hand threads for the reception of correspondingly threaded nuts. A ratchet and pawl mechanism is provided to prevent rotation of the right and left hand nuts when they have been brought together, and it is in the improvement and simplification of this ratchet and pawl mechanism that our invention chiefly relates. This and other objects of the invention will more fully appear from the following detailed description, reference being had to the accompanying drawings, in which—

Fig. 1 a side view of the bolt element.

Figs. 2 and 3 are side and end elevations, respectively, of one of the nuts.

Figs. 4 and 5 are side and end elevations, respectively, of the other nut.

Fig. 6 is a view of the parts in assembled and locked position, the nuts being shown in section.

Like reference characters refer to like parts in the different figures.

Referring first to Fig. 1, the bolt shaft or equivalent element 1 provides inner and outer threaded portions 2 and 3, respectively. The inner portion 2 is of larger diameter than the outer portion 3, and the two portions are threaded oppositely, that is the threads on one are right handed and on the other left handed. A nut 4, Figs. 2 and 3, has internal threads so that it is adapted to be screwed onto the portion 2, as shown in Fig. 6, and similarly the other nut 5 screws onto the portion 3. One of the nuts provides a portion 6 of reduced external diameter. External peripheral ratchet teeth 7 are cut or formed thereon.

The nut not having the ratchet teeth on its face carries a pawl 8 by means of a pivot stud 9. The pawl 8 can readily be made by a stamping process, and only a tail portion 10 thereof projects beyond the polygonal sides of the nut. A tooth 11 of the pawl 8 is forced inwardly by a spring 12. This spring 12 consists of a wire looped around a holding stud 13, one end of the wire being inserted in a hole 14 in the nut 5, and the other end pressing against the pawl.

In the use of our improved nut lock, the bolt is passed through an object to be held, 15, and the nut 4 is tightened by any suitable wrench. The nut 5 is then screwed on and the pawl tooth 11 caused to engage the ratchet 7. The nut 5 is then tightened until the pivot stud 9 comes up against the end face of the nut 4. The pawl and ratchet now prevent unturning of the nut by vibration, but if it is desired that they be removed, it is only necessary to press in the tail piece 10. This may be done by any suitable wrench, as the tail piece 10 projects just far enough to be engaged by a wrench as it is placed in position over the nut 5, this action being sufficient to disengage the pawl 8 from the ratchet 7.

The pawl 8 has a flat portion 16, the plane of which is approximately perpendicular to a radial line of the pawl, and when the tooth 11 is moved outwardly the spring 12 engages this flat portion and holds the pawl until it is snapped inwardly again. It is desirable to screw the nut 5 onto the portion 3 with the pawl in this position, as otherwise the side of the tooth 11 engages the portion 6.

In order that a nut lock should work properly, it is necessary that fine adjustment be provided. This feature is present in our invention, for the teeth 7 are separated by but a small fraction of a turn, so that no matter what the size of the piece 15, the outer nut can always be screwed down to put pressure on the inner nut. At the same time, the pawl 8 is easy to make, and all that has to be done to the nut carrying the pawl is to drill three holes therein and tap two of them. The teeth 7 can readily be cut at a single operation by a hot stamping process.

We claim:

1. In a nut lock mechanism, the combination with a bolt or shaft having contiguous oppositely threaded portions, an inner nut and an outer nut, of a reduced portion on one nut having peripheral ratchet teeth, a spring pressed pawl on the face of the other nut to cooperate with said ratchet teeth, and a pivot for said pawl adapted to receive the pressure between said nuts, leaving said pawl free to be turned.

2. In a nut lock mechanism, the combination with a bolt or shaft having contiguous oppositely threaded portions, an inner nut and an outer nut, of a reduced portion on one nut having peripheral ratchet teeth, a pivotally mounted pawl on the face of the other nut to cooperate with said ratchet teeth, a spring to normally press said pawl towards said teeth, and means controlled by said spring for holding said pawl in a disengaged position.

3. In a nut lock mechanism, the combination with a bolt or shaft having contiguous oppositely threaded portions, an inner nut and an outer nut, of a reduced portion on one nut having peripheral ratchet teeth, a spring pressed pivotally mounted pawl on the face of the other nut to cooperate with said ratchet teeth, and a tailpiece on said pawl projecting beyond a polygonal side of said outer nut to release said pawl.

ARTHUR F. BARTLETT.
WILLIAM F. STRAUB.